United States Patent
Lai et al.

(10) Patent No.: US 7,555,290 B2
(45) Date of Patent: Jun. 30, 2009

(54) METHOD OF AUTOMATICALLY SEARCHING A MATCHED MOBILE PHONE BY MEANS OF CONVERSATION FUNCTION OF A PERSONAL HANDYPHONE SYSTEM MOBILE PHONE

(75) Inventors: Cheng-Shing Lai, Taipei (TW); Xiao-Long Fan, Nankng (CN); Peng-Hui Liu, Nankng (CN)

(73) Assignee: Inventec Appliances Corp. (TW)

( * ) Notice: Subject to any disclaimer, the term of this patent is extended or adjusted under 35 U.S.C. 154(b) by 969 days.

(21) Appl. No.: 11/136,549

(22) Filed: May 25, 2005

(65) Prior Publication Data

US 2006/0063526 A1 Mar. 23, 2006

(30) Foreign Application Priority Data

Sep. 20, 2004 (TW) .............................. 93128406 A

(51) Int. Cl.
*H04Q 7/22* (2006.01)
(52) U.S. Cl. .................... 455/414.1; 455/410; 455/415; 455/424

(58) Field of Classification Search .............. 455/414.1, 455/410, 415, 424
See application file for complete search history.

(56) References Cited

U.S. PATENT DOCUMENTS 6,996,531 B2 * 2/2006 Korall et al. ................. 704/270

* cited by examiner

*Primary Examiner*—Nghi H Ly
(74) *Attorney, Agent, or Firm*—Bacon & Thomas, PLLC

(57) ABSTRACT

A method of automatically searching a matched mobile phone by means of conversation function of a personal handyphone system (PHS) mobile phone, which comprises steps of issuing a conversation setup request to other PHS mobile phones via a wireless communication after receiving a user's personal information setup and entering into a search and conversation function mode, selecting one of other mobile phones that support the same function mode and nearby receive the conversation setup request for a valid conversation setup, and then performing personal information exchanges therebetween, enabling the PHS mobile phone users to determine whether or not to make friends via the PHS mobile phones according to the personal information being received.

8 Claims, 2 Drawing Sheets

METHOD OF AUTOMATICALLY SEARCHING A MATCHED MOBILE PHONE BY MEANS OF CONVERSATION FUNCTION OF A PERSONAL HANDYPHONE SYSTEM MOBILE PHONE

FIELD OF THE INVENTION

The present invention relates to a method of searching a matched mobile phone, more particularly to a method of utilizing conversation function of a personal handyphone system (PHS) mobile phone to automatically search a matched PHS mobile phone, without requiring participation of a communication service provider, occupying communication resources and spending additional communication fees, for making friends with the one who owns the matched PHS mobile phone.

BACKGROUND OF THE INVENTION

In recent years, mobile communication technologies are developed rapidly, and the open mobile communication business results in a drastic increase of mobile communication users. Mobile phones have the mobile features, and create a good business opportunity for the mobile phone industry. Particularly, a personal handyphone system (PHS) mobile phone is exquisite, fashionable, and inexpensive. Unlike fixed telephones, the PHS mobile phones have more powerful functions than the fixed telephones. Therefore, most families install one or more PHS phones in addition to the installation of a fixed telephone at home.

Further, the mobile phone also plays a role of match maker for coupling users to be friends over the mobile phones, and the fashion of making friends through mobile phones, not only benefits young people, but also interests middle age people. Mobile phones bring lots of fun to people who want to match friends over the mobile phone.

The friends matching related services provided by mobile phone companies are very popular, not only satisfy those who like chatting, but also serve as a match maker. Therefore, mobile system manufacturers provide various different services to meet the market requirements.

However, the value-added service of this sort is usually carried out on a dedicated website or a dedicated agency, and thus basically requiring membership and the participation of a third party. Members must be registered first and provide basic personal information or condition setup, and also need the participation of a cell station (CS) before they can communicate with each other. Users cannot search a friend over the mobile phone anywhere and anytime.

Since system manufacturers provide value-added services to system users, therefore most of these services require additional monthly rentals or telephone fees. Furthermore, the procedure is more complicated and user's privacy will not be protected as well.

However, more and more people are using such value-added service for the occasions of making and socializing with friends. In the meantime, the number of PHS mobile phone users is increased drastically. In view of this problem, the inventor of the present invention aggressively researched and developed a method for automatically searching a matched mobile phone by means of the conversation function of PHS mobile phones to meet the market requirements and improve its competitiveness among similar products.

SUMMARY OF THE INVENTION

From the profound description of the aforementioned prior art, it is obvious that the trend of making friends through mobile phones is very popular now, but it requires the participation of a third party to conduct such activity via a medium of a cell station to communicate with each other. The procedure is very complicated and also has a security issue of user's privacy. To meet the actual needs for the fast changing market and overcome the foregoing shortcomings, the inventor of the present invention based on years of experience in the related industry to conduct extensive researches and experiments, and finally invented a method of automatically searching a matched mobile phone by means of conversation function of a personal handyphone system (PHS) mobile phone, in hope of fully utilizing the conversation function of the PHS mobile phone to achieve the objective of making friends through PHS mobile phones without requiring the participation of the cell station. The invention makes the user's life more exciting and its application more convenient.

It is a primary objective of the present invention to provide a method of automatically searching a matched mobile phone by means of conversation function of a personal handyphone system (PHS) mobile phone, and this method has the following advantages:

1. Compared with the traditional method of making friends through mobile phones, the present invention uses the PHS mobile phones of two parties to automatically implement the whole process and carries out the process anytime and anywhere without requiring the participation of a third party, so that users feel freer, and the communication is safer. Users can locate their friends without the slightest hesitancy.

2. The present invention does not require conducting the communication between two parties via a cell station and thus reduces the waste of communication resources, and users do not have to pay additional communication fees.

3. The present invention fully utilizes the conversation function of the PHS mobile phone by adding a valuable function on the existing hardware. It does not need additional hardware support.

The above and other objects, features and advantages of the present invention will become apparent from the following detailed description taken with the accompanying drawings.

DETAILED DESCRIPTION OF THE PREFERRED EMBODIMENTS

Figure 1:
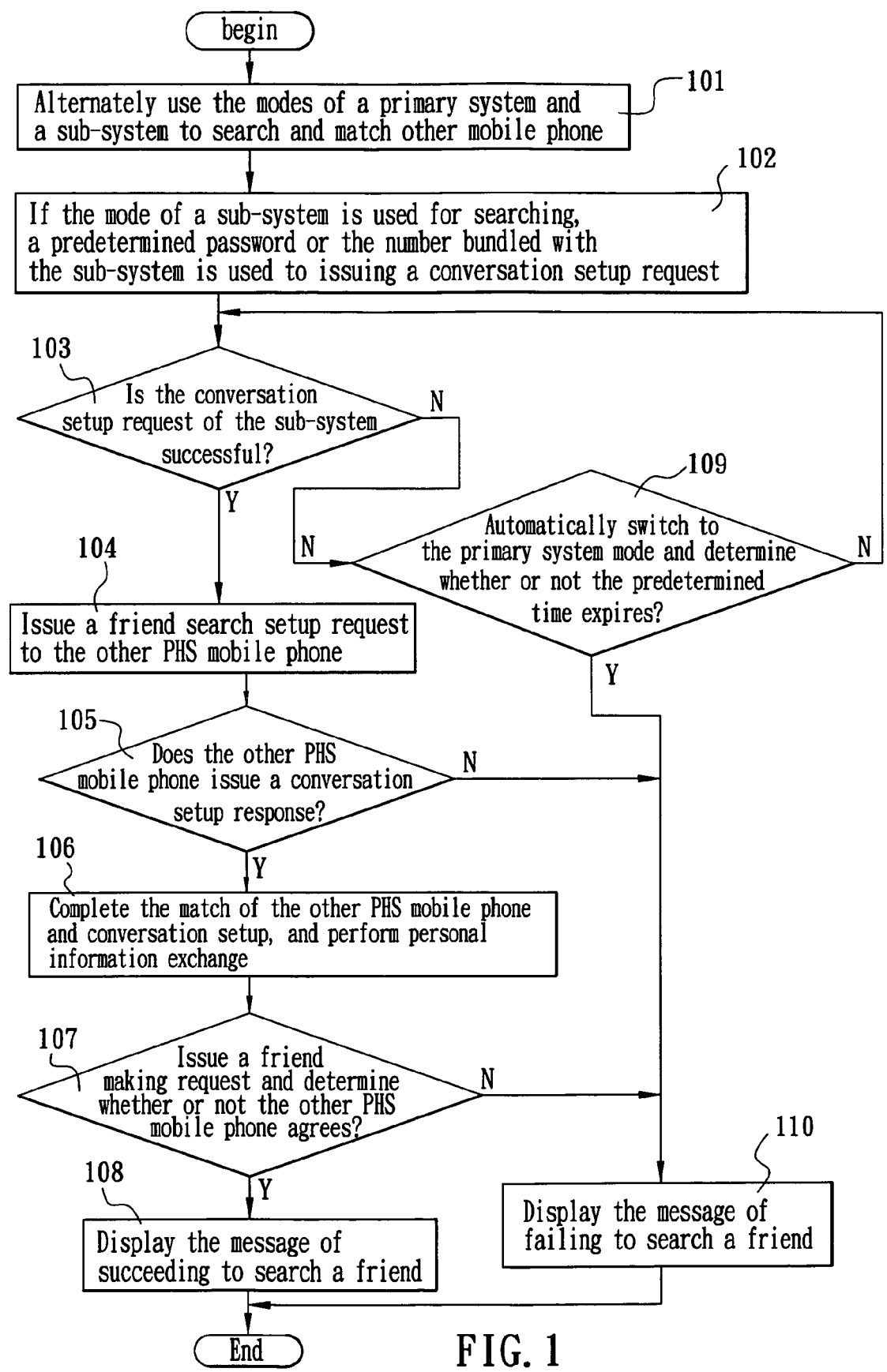
FIG. 1 is a flow chart of the process after the PHS mobile phone receives a user's personal information and enters into the searching and conversation function modes.

A method of searching a matched mobile phone, and more particularly to a method of automatically searching a matched mobile phone by means of conversation function of a personal handyphone system (PHS) mobile phone. The PHS mobile phone of this method has received a user's personal information setup and entered into a search and conversation mode, the PHS mobile phone will automatically and continuously issue a conversation setup request through wireless communication by using a predetermined password, a primary system number or a number bundled to its sub-system. When other PHS mobile phones supporting the same function mode nearby receive the conversation setup request and send back responses, the PHS mobile phone will select one of the other PHS mobile phones to process an effective conversation setup. Then, the PHS mobile phone and the other PHS mobile phone will automatically perform user's personal information exchanges and display a result of the conversation setup for the PHS mobile phone user. If the PHS mobile phone user is willing to make friends, the PHS mobile phone will issue a friend making request to the other PHS mobile phone (which is also referred to as an opposite party) according to the PHS mobile phone user's instruction. If the other PHS mobile phone user is also willing to make friends and contact with, then the opposite party will issue an agree response according to the other PHS mobile phone user's instruction, so that both of the PHS mobile phone users will use the set conversation functions provided their PHS mobile phone to mutually communicate with each other via telephone calls and short messages. If the other PHS mobile phone user is not willing to make friends, the opposite party will issue a refuse response for making friends. The PHS mobile phone and the other PHS mobile phone will then resume their original status of set conversation function. Therefore, the invention achieves the function of automatically searching the other PHS mobile phone that matches the PHS mobile phone for making friends by means of the search and conversation mode.

The method in accordance with the present invention comprises the steps of inputting the user's personal information setup, and searching the other matched mobile phone, wherein the input of personal information setup is used for the other PHS mobile phone user to view the PHS mobile phone user's personal information during communications, and then determine whether or not to accept user's request for making friends.

The search for the other matched PHS mobile phone is taken place when the PHS mobile phone enters into the search function mode, and the search for the other matched mobile phone will continues alternately via mode of a primary system and a sub-system within a user's predetermined time. If the PHS mobile phone enters into the search function mode under the sub-system mode, a conversation setup request will be sent to the surroundings by means of a specified password or a number bundled to its sub-system. After the conversation setup request is succeeded, a search setup request will be sent to the other PHS mobile phone. Since the other PHS mobile phone under the primary system mode may bundle several PHS mobile phones under the sub-system mode at the same time, therefore the other PHS mobile phone selects the PHS mobile phone who sent the search setup request, and issues a setup permission to the PHS mobile phone. After the PHS mobile phone receives the setup permission, the search for the other matched PHS mobile phone is completed. If the PHS mobile phone is unable to find the other matched PHS mobile phone or receives a refusal response, then the PHS mobile phone will switch to the primary system mode automatically and try again until a predetermined time expires.

Further, if the PHS mobile phone cannot find the other matched PHS mobile phone under the sub-system mode, it will switch to the primary system mode and issue a conversation setup request with a fixed group password. If a search setup request sent from the other PHS mobile phone under the sub-system mode is received, the PHS mobile phone will immediately send a setup permission to the other PHS mobile phone. Thus, the search for the other PHS mobile phone under sub-system mode is completed. If the PHS mobile phone under the primary system mode has not received the search setup request issued from the other PHS mobile phone under the sub-system mode, then it will automatically switch to the sub-system mode and try again until a predetermined time expires.

Searching for a friend is taken place after the PHS mobile phone completes searching the other matched PHS mobile phone, and the one-to-one conversation between them is set up successfully. Then, both parties can use the conversation setup for personal information exchange. After one party sees the personal information of the opposite party and is willing to make friends, a making friends request is issued to the opposite party. If the opposite party agrees to make friends, a response of permission will be issued by the opposite party to complete the process of searching for a friend. Both parties can then use the set conversation for transmitting voice data. If the opposite party refuses the making friends request, then both parties will automatically cancel the conversation setup, and a message for failing to search for a friend will be displayed on the PHS mobile phones for the users' references.

The conversation function of the PHS mobile phone features a mutual communication without going through a cell station (CS) and a communication free of charge.

Referring to FIG. 1 for the method of automatically searching for a matched PHS mobile phone according to a preferred embodiment of the present invention, the following procedure will take place after a PHS mobile phone receives a user's personal information setup and enters into a search and conversation function mode.

Step (101): Continuously search and match the other PHS mobile phone alternately via a primary system mode and a sub-system mode within a user's predetermined time;

Step (102): When the PHS mobile phone uses the sub-system mode to enter into the search function mode, the PHS mobile phone will send a conversation setup request under the sub-system mode to the surroundings by means of a predetermined password or a number bundled to the sub-system;

Step (103): Determine whether or not the conversation setup request issued by the PHS mobile phone under the sub-system mode is succeeded. If yes, then go to Step (104). If no, then go to Step (109);

Step (104): Issue a search setup request to the other mobile phone;

Step (105): Determine whether or not the other PHS mobile phone has sent a setup permission message back to the PHS mobile phone after receiving the search setup request; if yes, then go to Step (106); if no, go to Step (110);

Step (106): Complete the search setup and the conversation setup with the other matched PHS mobile phone, and proceed the personal information exchanges therebetween;

Step (107): Send a making friends request, and determine whether or not a response from the other PHS mobile phone agreeing to make friends is received. If yes, go to Step (108); if no, then go to Step (110);

Step (108): Display the message of successfully searching for a friend and then end the procedure for this time;

Step (109): Automatically switch to the primary system mode and determine whether or not the predetermined time expires; if yes, go to Step (110); if no, go to Step (103);

Step (110): Display the failure of searching for a friend, and then end the procedure.

Figure 2:
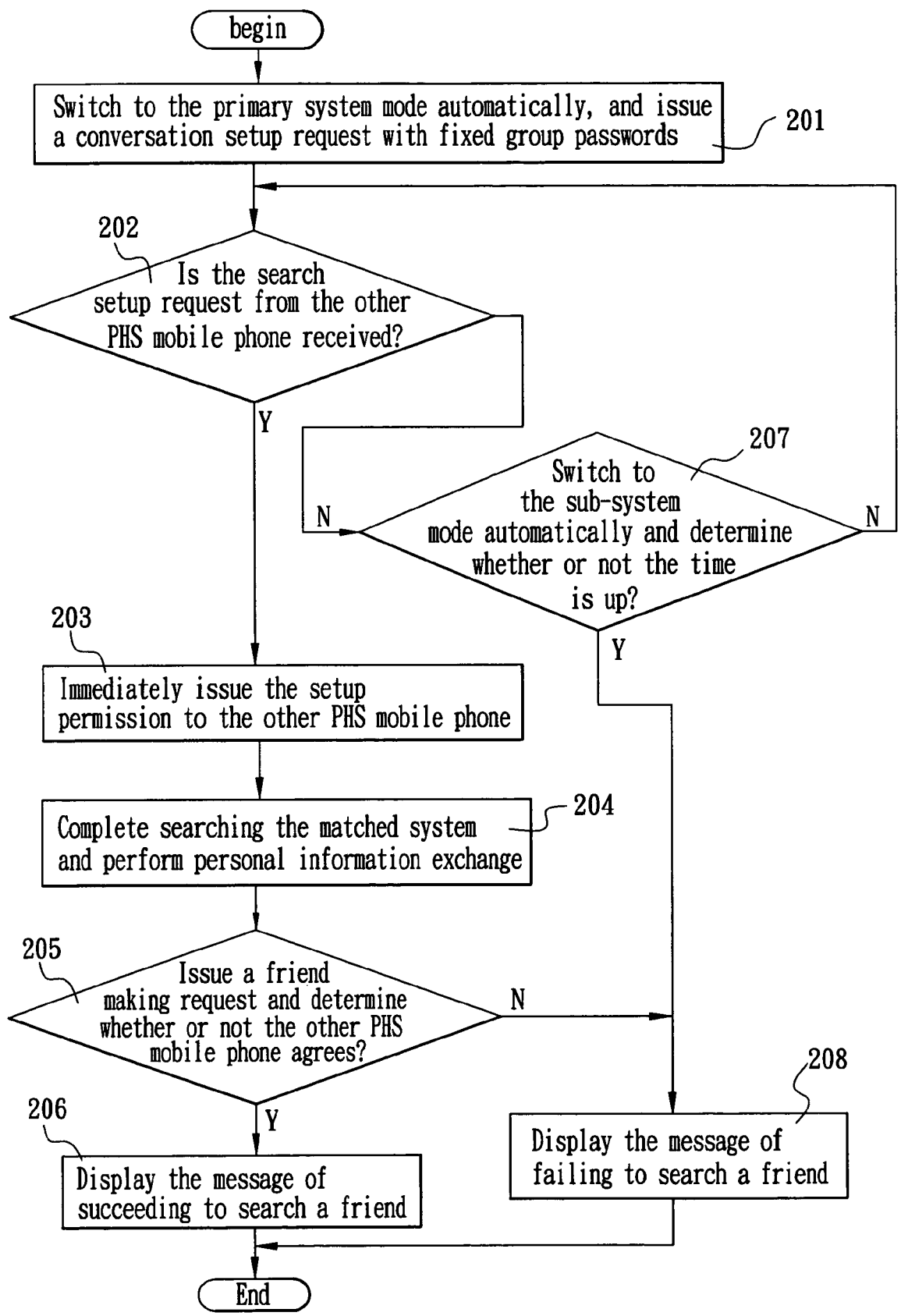
FIG. 2 is a flow chart of switching the PHS mobile phone as depicted in FIG. 1 into a primary system mode and entering into a search function mode.

Referring to FIG. 2, the following procedure will take place, when the PHS mobile phone cannot find the other matched PHS mobile phone under the sub-system mode.

Step (201): Switch to the primary system mode, and issue a conversation setup request with a fixed group password;

Step (202): Determine whether or not a conversation setup response from the other PHS mobile phone under a sub-system mode is received; if yes, go to Step (203); if no, go to Step (207);

Step (203): Issue a conversation setup permission to the other PHS mobile phone under the sub-system mode immediately;

Step (204): Complete the procedure of search setup and conversation setup with the other PHS mobile phone under the sub-system mode, and proceed the personal information exchanges therebetween;

Step (205): Issue a making friends request and determine whether or not a response willing to make friends from the other PHS mobile phone under the sub-system mode is received; if yes, go to Step (206); if no, go to Step (208);

Step (206): Display the message of searching a friend successfully, and end the procedure.

Step (207): Switch to the sub-system mode automatically and determine whether or not the predetermined time expires; if yes, go to Step (208); if no, return to Step (202); and Step (208): Display the message of failing to search for a friend, and end the procedure.

After the making friends request is granted, both parties can freely communication with each other by making phone calls or sending e-mails on the set conversation basis.

While the invention has been described by means of specific embodiments, numerous modifications and variations could be made thereto by those skilled in the art without departing from the scope and spirit of the invention set forth in the claims.

What is claimed is:

1. A method of automatically searching a matched mobile phone by means of conversation function of a personal handyphone system (PHS) mobile phone, which enables a PHS mobile phone to proceed with a process after receiving a user's personal information setup and then enter into search and conversation function modes, comprising the steps of:
    issuing a conversation setup request with a predetermined password, a primary system number or a number bundled to a sub-system via a wireless communication;
    selecting one of other PHS mobile phones for a valid conversation setup, when the other PHS mobile phone supporting the same function modes nearby receives the conversation setup request and responses, and performing a user's personal information exchange with the other PHS mobile phone automatically and displaying a result of the conversation setup;
    issuing a request for making friends to the other PHS mobile phone, according to the PHS mobile phone user's instruction;
    receiving a response for making friends from the other PHS mobile phone; and
    using the conversation function to communicate with the other PHS mobile phone.

2. The method of automatically searching a matched mobile phone by means of conversation function of a personal handyphone system (PHS) mobile phone of claim 1, after the PHS mobile phone receives the user's personal information setup and enters into the search and conversation function modes, further comprises the steps of:
    searching the other PHS mobile phone alternately via the modes of the primary system and the sub-system within a user's predetermined time;
    issuing the conversation setup request with the predetermined password or the number bundled to said sub-system, when the PHS mobile phone enters into a search function via the sub-system mode;
    issuing a search friend setup request to the other PHS mobile phone, after receiving a conversation setup response from the other PHS mobile phone;
    performing personal information exchanges with the other PHS mobile phone, after receiving a search friend setup response; and
    issuing a making friends request to the other PHS mobile phone, and displaying the message of searching a friend successfully after receiving a response of permission for making friends from the other PHS mobile phone.

3. The method of automatically searching a matched mobile phone by means of conversation function of a personal handyphone system (PHS) mobile phone of claim 2, wherein the PHS mobile phone automatically switches to the primary system mode, when the conversation setup of the PHS mobile phone under the sub-system mode is failed; and the PHS mobile phone displays a failure of searching for a friend, when the predetermined time is expired.

4. The method of automatically searching a matched mobile phone by means of conversation function of a personal handyphone system (PHS) mobile phone of claim 2, wherein the PHS mobile phone displays a failure of searching for a friend, when the PHS mobile phone under the sub-system mode receives no setup permission from the other PHS mobile phone.

5. The method of automatically searching a matched mobile phone by means of conversation function of a personal handyphone system (PHS) mobile phone of claim 2, further comprising a step of displaying a failure of searching for a friend, when the making friends request is issued and the other PHS mobile phone doesn't sent back a making friends permission.

6. The method of automatically searching a matched mobile phone by means of conversation function of a personal handyphone system (PHS) mobile phone of claim 2, wherein said method further comprises the steps of, when the PHS mobile phone under the sub-system mode cannot search the other PHS mobile phone:
    switching to the primary system mode automatically and issuing the conversation setup request with a fixed group password;
    issuing a setup permission message to the other PHS mobile phone under the sub-system mode, after receiving a conversation setup response issued by the other PHS mobile phone;
    completing the conversation setup and search setup with the other PHS mobile phone, and performing the personal information exchanges therebetween; and
    issuing the making friends request, and displaying a message of successfully searching for a friend after receiving the response of permission for making friends from the other PHS mobile phone.

7. The method of automatically searching a matched mobile phone by means of conversation function of a personal handyphone system (PHS) mobile phone of claim 6, further comprising the steps of automatically switching to the sub-system mode, when the search friend setup response issued from the other PHS mobile phone is not received within a predetermined time, and displaying a failure of searching a friend.

8. The method of automatically searching a matched mobile phone by means of conversation function of a personal handyphone system (PHS) mobile phone of claim 6, further comprising the step of displaying a failure of searching a friend, when the other PHS mobile phone doesn't sent back a permission message after receiving the making friends request.

* * * * *